(12) United States Patent
Suzuki et al.

(10) Patent No.: US 10,487,710 B2
(45) Date of Patent: Nov. 26, 2019

(54) VALVE UNIT INCLUDING AN INTERFACE

(71) Applicants: Bosal Emission Control Systems NV, Lummen (BE); Mikuni Corporation, Tokyo (JP)

(72) Inventors: Keigo Suzuki, Kanagawa (JP); Vik Haesen, Tessenderlo (BE)

(73) Assignees: Bosal Emission Control Systems NV, Lummen (BE); Mikuni Corporation, Tokyo (JP)

( * ) Notice: Subject to any disclaimer, the term of this patent is extended or adjusted under 35 U.S.C. 154(b) by 26 days.

(21) Appl. No.: 15/901,325

(22) Filed: Feb. 21, 2018

(65) Prior Publication Data

US 2018/0238209 A1     Aug. 23, 2018

(30) Foreign Application Priority Data

Feb. 22, 2017   (EP) .................................... 17157414

(51) Int. Cl.
| *F01N 1/16* | (2006.01) |
| *F16K 1/22* | (2006.01) |

(Continued)

(52) U.S. Cl.
CPC ............. *F01N 1/165* (2013.01); *F01N 13/18* (2013.01); *F02D 9/00* (2013.01); *F02D 9/02* (2013.01);

(Continued)

(58) Field of Classification Search
CPC . F01N 1/165; F01N 13/18; F02D 9/00; F02D 9/02; F02D 9/04; F02D 9/08;

(Continued)

(56) References Cited

U.S. PATENT DOCUMENTS

| 5,188,078 A | 2/1993 | Tamaki |
| 5,535,720 A | 7/1996 | Pantalleresco |

(Continued)

FOREIGN PATENT DOCUMENTS

| DE | 1202437 A1 | 7/1992 |
| DE | 102009011951 A1 | 9/2010 |

(Continued)

OTHER PUBLICATIONS

Search Report for European Patent Application No. 17157414.8, dated Sep. 4, 2017.

*Primary Examiner* — Audrey K Bradley
*Assistant Examiner* — Kelsey L Stanek
(74) *Attorney, Agent, or Firm* — Merchant & Gould P.C.

(57) ABSTRACT

A modular valve unit for controlling the flow rate of an intake or exhaust gas of a combustion engine through the passage of a valve, the valve unit comprising a valve having a valve housing (1) and at least one valve flap (2). The valve unit further comprises an interface (3) and an adapter (6), the interface (3) being connected to the valve housing (1) and having a support (32) and an engagement portion comprising at least two engagement legs (31) projecting from the distal end of the support (32) and being directed away from the valve housing (1). The adapter (6) has a connection plate (62) having at least two engagement orifices (61) for receiving the engagement legs (31) of the interface (3) and a mounting portion for holding an actuator (7). The at least two engagement orifices (61) of the connection plate (62) of the adapter (6) are each configured to engage the corresponding at least two engagement legs (31) of the engagement portion of the interface (3).

18 Claims, 6 Drawing Sheets

(51) Int. Cl.
*F01N 13/18* (2010.01)
*F02D 9/00* (2006.01)
*F02D 9/02* (2006.01)
*F02D 9/04* (2006.01)
*F02D 9/08* (2006.01)
*F02D 9/10* (2006.01)
*F02D 11/10* (2006.01)

(52) U.S. Cl.
CPC .............. *F02D 9/04* (2013.01); *F02D 9/08* (2013.01); *F02D 9/10* (2013.01); *F02D 9/107* (2013.01); *F02D 9/1075* (2013.01); *F02D 11/10* (2013.01); *F16K 1/221* (2013.01)

(58) Field of Classification Search
CPC .......... F02D 9/10; F02D 9/107; F02D 9/1075; F16K 1/221
USPC ........................................................... 60/324
See application file for complete search history.

(56) References Cited

U.S. PATENT DOCUMENTS

| | | |
|---|---|---|
| 6,026,782 A | 2/2000 | Daly et al. |
| 2012/0280161 A1 | 11/2012 | Weidner et al. |

FOREIGN PATENT DOCUMENTS

| | | |
|---|---|---|
| DE | 102009016597 A1 | 10/2010 |
| DE | 102010027930 A1 | 10/2011 |
| DE | 102011107088 A1 | 1/2013 |
| DE | 102014017524 A1 | 6/2015 |
| EP | 1024271 A2 | 8/2000 |
| EP | 1298299 A2 | 4/2003 |
| GB | 2519239 A | 4/2015 |
| WO | 2007/090286 A1 | 8/2007 |

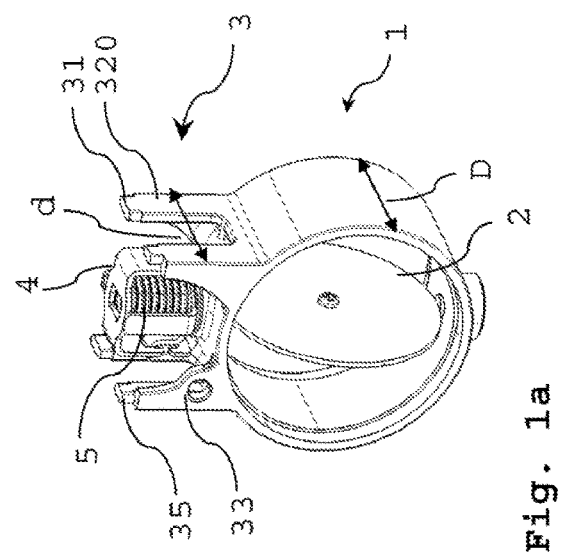
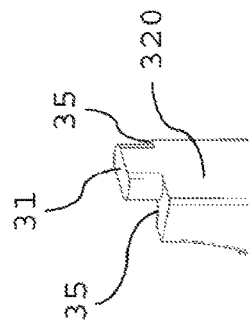
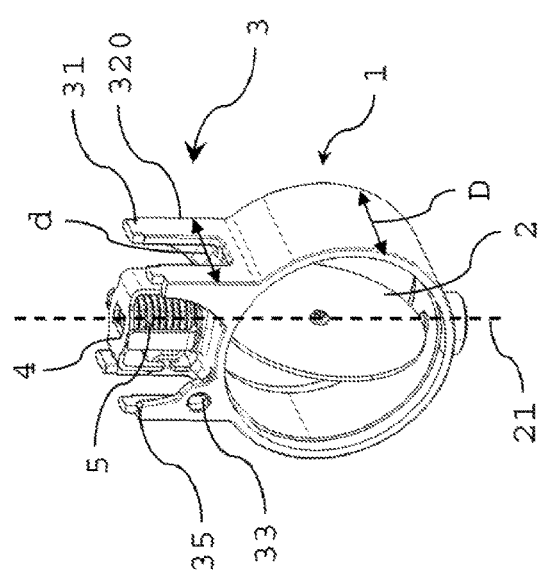
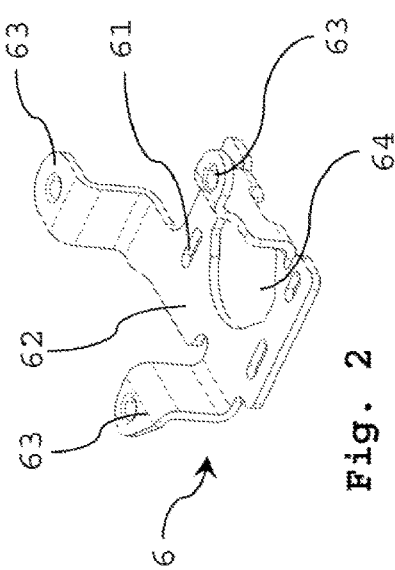

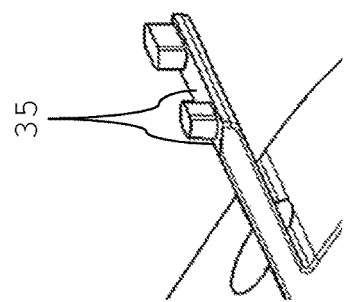
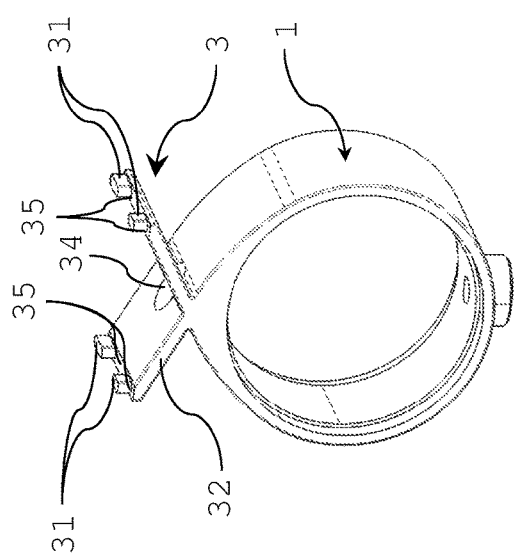
Fig. 5
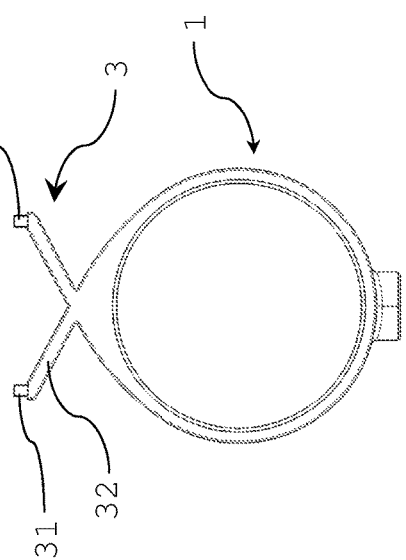
Fig. 5a
Fig. 5b

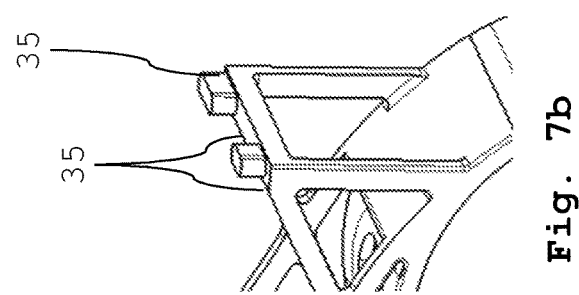
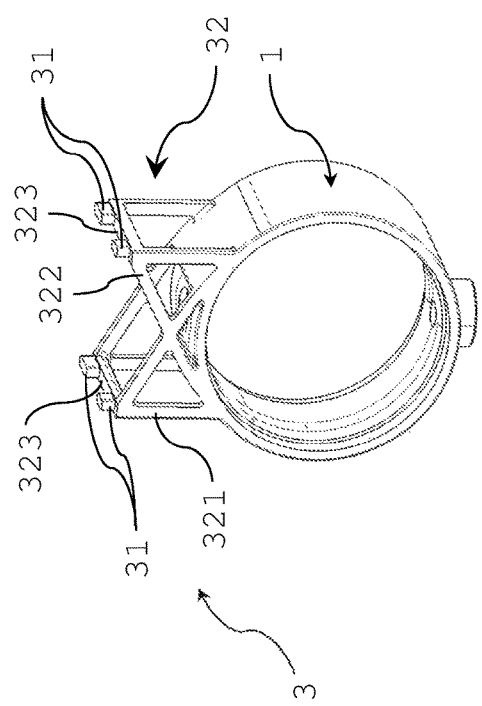
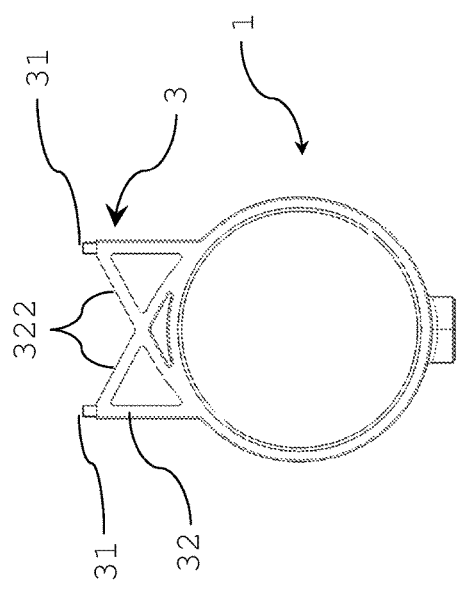

VALVE UNIT INCLUDING AN INTERFACE

This application claims benefit of Ser. No. 17/157,414.8, filed on 22 Feb. 2017 in the European Patent Office and which application is incorporated herein by reference. To the extent appropriate, a claim of priority is made to the above disclosed application.

FIELD OF THE INVENTION

The present invention relates to a modular valve unit for controlling the flow rate of a gas through the passage of a valve, the valve unit comprising an interface and an adapter engaging with the interface. The invention further relates to a valve assembly comprising the valve unit and an actuator. The invention also relates to a method for connecting the valve unit according to the invention to tubular pipes in particular to an intake or exhaust tubular pipe system of a combustion engine.

BACKGROUND

The automotive industry is more and more oriented in the integration of active exhaust components, towards the reduction of fuel consumption, reduced emission of pollutants, reduced noise levels. A key feature towards these highly sensitive requirements is the design of the exhaust valve for specific combustion engine and vehicle applications.

In particular, active valves become more and more applied in exhaust systems, particularly for use in exhaust systems for combustion engines with cylinder deactivation technology, the cylinder deactivation generally occurring during partial load operation of the engine. Under partial load, these engines will switch off one or more cylinders leading to significant deterioration of the noise. Active acoustical valves, generally active acoustic butterfly valves, are used to this purpose. The acoustic valves can be switched from fully closed over any intermediate position to fully open position by an actuator to optimize the noise reduction depending on the vehicle operating conditions. Hence, active acoustical valves allow for an optimal noise level in all operating conditions of the engine with internal combustion.

Besides the development efforts for the design of an appropriate valve, each valve may be combined with different actuators depending on the requirements of the automotive industry, particularly regarding the supplier for the actuator. For the same valve, several different actuator suppliers may be selected—A same valve may therefore be paired with different actuators, leading to laborious development efforts for adapting the valve to each actuator. Additionally, each valve/actuator pairing has to be validated before serial production. For large production quantities, such development and validation efforts may be negligible. There are, however, specific areas in which the production quantities are small and the costs for development and validation of various valve/actuator combinations considerable compared to the production quantities.

Specifically, the use of valve units in exhaust systems for combustion engines with cylinder deactivation technology or for high power engines is particularly challenging because of the relatively small production quantities, leading to time consuming development and validation efforts resulting in high costs compared to the small sales volume for such valve units.

It is therefore an object of the invention to suggest a valve unit which overcomes the above mentioned drawbacks and offer an improved valve unit.

SUMMARY OF THE INVENTION

These and other objects are achieved by the valve unit according to the invention and method for connecting the valve unit according to the invention to a tubular pipe system, as it is specified by the features of the independent claims. Further advantageous aspects of the valve unit according to the invention are the subject of the dependent claims.

Particularly, a modular valve unit comprising an interface and an adapter engaging with the interface is suggested.

Throughout the entire specification including the appended claims, the singular forms "a", "an", and "the" include the plural, unless the context explicitly dictates otherwise. Also, whenever features are combined with the term "or", the term "or" is to be understood to also include "and" unless it is evident from the specification that the term "or" must be understood as being exclusive.

The invention relates to a valve unit for controlling the flow rate of an intake or exhaust gas of a combustion engine through the passage of a valve, the valve unit comprising a valve having a valve housing and at least one valve flap, wherein the valve unit further comprises an interface and an adapter, the interface being connected to the valve housing and having a support and an engagement portion comprising at least two engagement legs projecting from the distal end of the support and being directed away from the valve housing, wherein the adapter has a connection plate having at least two engagement orifices, in particular through holes, for receiving (or engaging) the engagement legs of the interface and a mounting portion for holding an actuator, and wherein the at least two engagement orifices of the connection plate of the adapter are each configured to engage the corresponding at least two engagement legs of the engagement portion of the interface.

The term "distal" is used to describe parts of the support that are distant from the valve housing. Thus, distal refers to the extremity of the support of the interface. When used with reference to the engagement legs, "distal" also denotes the extremity of the engagement legs. The engagement legs may be beads or pins, for example circular or rectangular in shape, or elongated tabs. In particular, the connection plate is configured to engage the engagement legs of the interface.

Particularly, the at least one valve flap has a rotational axis, and the engagement legs, from the support to their distal end, are arranged in a direction parallel to the rotational axis of the rotatable valve flap. The engagement legs may be formed by beads having the shape of rectangular cuboids or have a cylindrical or oval shape or any other suitable shape.

The engagement orifices in the connection plate of the adapter may particularly be through-holes, through which the engagement legs of the interface may extend. This has the advantage, that welding or other mechanical fastening of the adapter to the interface is simplified by direct access on top of the connection plate.

The valve unit according to the present invention has the advantage to offer a modular concept allowing the pairing of different actuators with various valve housings of different size and shape without having to run time consuming and costly development steps and validation tests and with less tooling. Valve housing diameters generally range from 40 mm to 80 mm, particularly from 45 mm to 70 mm, very particularly from 50 mm to 70 mm, whereas the valve housing width generally ranges from 30 mm to 40 mm. Additionally, the modular concept allows for manufacture of larger number of modular valve units, thereby amortizing the costs, e.g. for development, validation or tooling, over larger production quantities. Once a specific interface has been developed with a standardized engagement portion, it may be used as interface which may be paired to valve housings of any size and shape. A standardized engagement portion means that the engagement legs are standardized such to engage a particular standardized configuration of the engagement orifices in the connection plate. The adapter, on its part, will be configured to engage the standardized engagement portion on one side and will additionally be configured to receive (or engage) a specific actuator on the other side. Thus, for one specific interface, several adapters may be developed for holding different actuators depending on the requirements of the automotive industry, for example related to suppliers of the actuator. Hence, different actuators may be used for one identical valve unit by choosing the adapters corresponding to the actuator, as the other side of the adapter is configured to engage the standardized engagement portion of the interface.

In an analogous way, once the adapters are configured to hold specific actuators, valve housings of different sizes and shapes may be paired with the standardized engagement portion of the interface, which in turn may engage the connection plate of the adapter accordingly. Hence, different valve housings having various sizes and shapes may be paired with diverse actuators without the need of costly development and validation of the valve unit and larger production quantity of modular valve units.

The valve unit according to the invention thus allows maximal modularity with reduced development requirements and overall costs as well as compact construction.

Another advantage of the valve unit according to this aspect of the invention is the use of a maximum common building blocks allowing for high modularity and efficient transfer onto of existing valve concepts, or from one valve concept to another, with low development needs.

Moreover, the valve unit according to the invention allows for easy manufacture of an interface having an interface width which is smaller or equal to the valve housing width, the valve housing width being the width from the valve inlet to the valve outlet and the interface width is the width of the interface from its one extremity to its other extremity in the same direction of the valve housing width. Such valve unit is particularly well accessible for attaching, for example welding the valve unit to a tubular pipe. Additionally, when the interface width is selected to be smaller than or equal to the valve housing width, interference of the joint at the transition of the interface and the valve housing with the weld connections of the tubes to the valve housing is prevented.

The connection plate may be flat or following any other plane curve. The latter may be advantageous when the engagement legs and shoulders are not located in one plane but on different levels such to form a poka-yoke structure allowing only one positioning of the adapter, thereby preventing the adapter to be mounted in an incorrect position. A flat connection plate, however, is easier to manufacture than a curved connection plate. Additionally, the shoulders do not have to be parallel to one same plane.

Particularly, at least one engagement leg, in particular each engagement leg, may be elongated in a direction orthogonal to the rotational axis of the valve flap. This arrangement is particularly advantageous for the secure and easy engagement of the connection plate of the adapter. In particular, at least two engagement legs may have dimensions or shapes differing from one another allowing for a poka-yoke structure preventing the assembling of the adapter in an incorrect position. One particular arrangement may be at least one engagement leg having a line contact and at least a second contact which is non-colinear with the line contact. The second contact may be a line contact or a punctual contact.

The engagement legs may advantageously project from the support in a direction parallel to the rotational axis of the valve flap, thereby allowing for easy positioning of the adapter onto the interface.

The valve unit according to the invention allows for more design freedom to optimize the support of the interface for stiffness, but also for minimal thermal loading of the actuator and for protection of the shaft coupler, with optimal material usage and weight.

According to another aspect of the valve unit according to the invention, at least the connection plate of the adapter is made of sheet metal.

The use of sheet metal for the connection plate allows for easy manufacture of the adapter, particularly regarding the formation of the engagement orifices in the connection plate and integration of the mounting portion. In particular, the mounting portion may be formed by projections being extensions of the sheet metal, the connection plate is made of. In particular, the sheet metal at least the connection portion is made of has a thickness ranging from 0.5 mm, particularly from 1 mm to 3 mm.

In accordance with another aspect of the valve unit according to the invention, interface may particularly comprise a shoulder arranged at the distal end of the support at the transition to each engagement leg against which shoulder the connection plate of the adapter abuts in its final position in the assembled state. The shoulder helps precise positioning, in particular in the direction of engagement, of the adapter by forming a plain stop, for example before attaching the connection plate to the interface. The shoulder may be formed either by a projection from the support in a direction orthogonally to the direction of the engagement leg or by the wall of the support of the interface or by a strut or bar in the support of the interface joining one engagement leg to another engagement leg.

The interface may comprise openings allowing for surrounding atmosphere, in particular surrounding air, to cool down the inner space of the interface by allowing the surrounding atmosphere to freely enter and exit the inner volume of the interface.

The support allows for stiffness of the interface and optimization of the thermal conduction. The optimization of the support has an essential role in fine-tuning the stiffness of the interface, depending on the requirements, and reduced thermal conductivity. The interface may comprise a shoulder at the distal end of the support (at the transition from the support to the engagement leg). Thus, the structure according to the invention allows for more design freedom to optimize the support of the interface for stiffness, while reducing for thermal loading of the actuator and of protection of the shaft coupler, with optimal material usage and weight.

In accordance with a further aspect of the valve unit according to the invention, the adapter is configured to fixedly hold an actuator. The fixation of the actuator to the adapter is typically done by a screw or bolt connection to allow serviceability of the actuator, but also rivets or adhesive or any other type of adequate connections known in the art.

In particular, the adapter further comprises at least one mounting portion for attaching an actuator for easy and secure attachment of an actuator to the adapter. The mounting portion may, in particular, be formed by projections projecting from the connection plate in a direction away from the valve housing.

Yet in accordance with another aspect of the valve unit according to the invention, the at least one valve flap has a rotational axis, and the connection plate is flat and arranged orthogonal to the rotational axis of the valve flap.

The connection plate being arranged orthogonally to the rotational axis of the valve flap allows for direct fixation of the actuator onto the adapter and accurate regulation of the valve flap.

In accordance with another aspect of the valve unit according to the invention, the engagement legs are self-centering and are form-fitted or interference-fitted with the engagement orifices in the connection plate of the adapter.

An interference-fit is a fastening between the adapter and the interface which is achieved by friction between the engaging portions after the parts are assembled, whereas a form-fit is intended for the accurate location of the adapter and the interface without friction between the engaging portions (engagement legs and engagement orifices). An interference-fit between the adapter and the interface is generally obtained by designing the external dimension of the engagement legs of the engagement portion which slightly exceeds the internal dimension of the engagement orifices in the connection plate of the adapter into which orifices the engagement legs will fit. Form-fitting is intended for the accurate location of the adapter and the interface which engagement portions (engagement legs and engagement orifices) assemble with play. The interference-fit may be such that it holds the interface and the adapter together until mechanical attachment of the connection plate of the adapter to the engagement portion of the interface by welding, for example, thereby securing the adapter in the intended position until the attachment step.

This embodiment is particularly advantageous, as the connection plate of the adapter is mounted onto self-centering engaging legs, no assembly jig is needed. In particular when the engagement legs are in interference-fit with the engagement orifices of the connection plate, the fixation of the adapter, for example by welding, does not need special attention for the positioning of the adapter.

The self-centering capacity of the engagement legs is achieved on the one side by the form-fitted or interference-fitted and on the other side by tapering ends of the engagement legs. In particular, the engagement legs may have a triangular or a trapezoidal shape tapering towards the distal end of the engagement legs.

In accordance with still a further aspect of the valve unit according to the invention, the connection plate of the adapter is mechanically attached to the engagement legs by interference-fit or welded to the engagement legs.

The engagement by interference-fit or by welding allows for secure holding and fixation of the adapter to the interface.

In accordance with a further aspect of the valve unit according to the invention, the interface is formed as one-piece structure with the valve housing.

Although the interface may be formed as a part separate to the valve housing, which part may then be connected to the valve housing, the valve housing is particularly advantageously formed by casting such to include as many parts as possible in the casting steps in order to reduce additional steps for connecting the interface to the valve housing. Hence, it is advantageous to form a one-piece valve housing comprising an interface. A one-piece structure is characterized by being formed in one piece without joining two pieces together (for example by welding). Additionally, even when using other techniques for forming the valve housing, such as additive manufacturing, forming the valve housing comprising the interface in one-piece has the advantage to simplify the manufacture of the valve unit and enhance the accuracy of the location of the interface on the valve housing. In general, the integration of several features in one manufacturing step reduces manufacturing costs and time and is particularly advantageous. The valve unit according to the present invention allows for incorporating several features of the modular valve unit having high added value in one step for different valve housing diameters, widths and shapes while using the advantage of the standardized engagement portion of the interface. Such procedure also reduces the adaptation of the molds for casting, as the standardized engagement portion is independent from the size and shape of the valve housing.

In another aspect of the valve unit according to the present invention, the interface is added onto the valve housing by additive manufacturing, also called 3D-printing.

The use of additive manufacturing for forming the interface on top of the valve housing has the advantage of very flexible manufacturing and fast design of prototypes.

In a further aspect of the valve unit according to the invention, the interface has an interface width which is smaller or equal to a valve housing width.

When the interface width is smaller or equal to the valve housing width, the valve housing width being the width from the valve inlet to the valve outlet and the interface width is the width of the interface from its one extremity to its other extremity in the same direction of the valve housing width, the valve unit is particularly well accessible for attaching, for example for welding the valve unit to a tubular pipe.

According to another aspect of the valve unit according to the invention, the interface comprises at least two asymmetrically configured engagement legs.

In accordance with another aspect of the valve unit according to the invention, the interface comprises at least two, particularly at least three non-colinear engagement legs.

Such asymmetrically disposed engagement legs allow for secure attachment of the adapter to the interface in the correct position without risk of incorrect assembly. One particular arrangement may be at least one engagement leg having a line contact and at least a second contact which is non-colinear with the line contact. The second contact may be a line contact or a punctual contact. Asymmetrically designed engagement legs may also be obtained by their location, orientation, size and shape for secure attachment of the adapter to the interface in the desired position.

Particularly, the interface may be formed by at least three struts, particularly four struts, each strut having at its distal end an engagement leg and comprising a shoulder at the distal end of the struts.

When at least three struts comprising engagement legs at their distal end are used, a particularly advantageous embodiment is formed which has low thermal conductivity, high cooling characteristics due to the large openings in the interface. The at least three struts and engagement legs may be asymmetrically designed (location of struts or engagement legs, orientation, size and shape of engagement legs) for secure attachment of the adapter to the interface in the desired position.

The struts may have various shapes, such as square or rectangular, tubular, I-shaped or L-shaped. The choice of the shape of the struts may optimize the stiffness of the interface and the heat transfer to the adapter. Additionally, these shapes are particularly well adapted when the interface is made through casting or additive manufacturing, facilitating the production of struts in these shapes.

In accordance with a further aspect of the valve unit according to the invention, the interface comprises at least one datum point, for example at least one through-hole, particularly located in or on the support of the interface.

The datum point serves as a reference point for subsequent machining or assembly process steps. As the interface is attached to the valve housing, the datum point is a very precise reference point for further processing. In particular, the datum point is formed by a through-hole, which may be used as marking orifice, for example, for fixation of tools for additional machining of the raw cast valve housing. The through-hole may also be used as attachment for holding the valve housing in a particular position, thereby enhancing the ease of manufacture of the valve unit. The presence of a datum point is particularly advantageous when the interface is formed as one-piece structure with the valve housing, very particularly when formed in one-piece by casting, such that the datum point is added in one single step, thereby reducing manufacture cost for the device.

In another aspect, the invention suggests a valve assembly comprising a valve unit according to the invention, further comprising an actuator fixedly mounted onto the adapter.

In another aspect, the invention suggests a method for connecting a valve unit according to the invention to tubular pipes, comprising the steps of welding inlet and outlet of the valve housing to tubular pipes, subsequently placing the adapter onto the interface by engaging the engagement orifices of the connection plate with the engagement legs of the engagement portion of the interface, and subsequently attach the adapter to the engagement legs of the interface, in particular by welding or by mechanical fastening.

The method according to the invention has the advantage of a very easy assembly of the valve unit according to the invention to an automotive tubular pipe system, in particular an exhaust tubular pipe system of a combustion engine with enhanced accessibility for the welding of the inlet and outlet of the valve housing to the tubular pipes.

The afore-mentioned embodiments are practical embodiments of the valve unit according to the invention.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

Further embodiments and advantages become apparent from the following description of detailed embodiments of the valve unit according to the invention with the aid of the drawings.

BRIEF DESCRIPTION OF THE DRAWINGS

The invention is further described with regard to embodiments, which are illustrated by means of the following drawings, wherein:

FIG. 1 is a valve comprising an interface according to one embodiment of the present invention;

FIG. 1a shows a different valve comprising an interface according to one embodiment of the present invention;

FIG. 1b is a detailed representation of the interface shown in FIGS. 1 and 1a;

FIG. 2 shows an adapter according to the invention;

FIG. 5 show another embodiment of the valve housing and 5a comprising an interface according to the invention;

FIG. 5b is a detailed representation of the interface shown in FIGS. 5 and 5a;

FIG. 6b is a detailed representation of the interface shown in FIGS. 6 and 6a;

FIG. 7 show a further embodiment of the valve housing and 7a comprising an interface according to the invention;

FIG. 7b is a detailed representation of the interface shown in FIGS. 7 and 7a;

FIG. 8b is a detailed representation of the interface shown in FIGS. 8 and 8a;

DETAILED DESCRIPTION OF EMBODIMENTS

Figure 4:
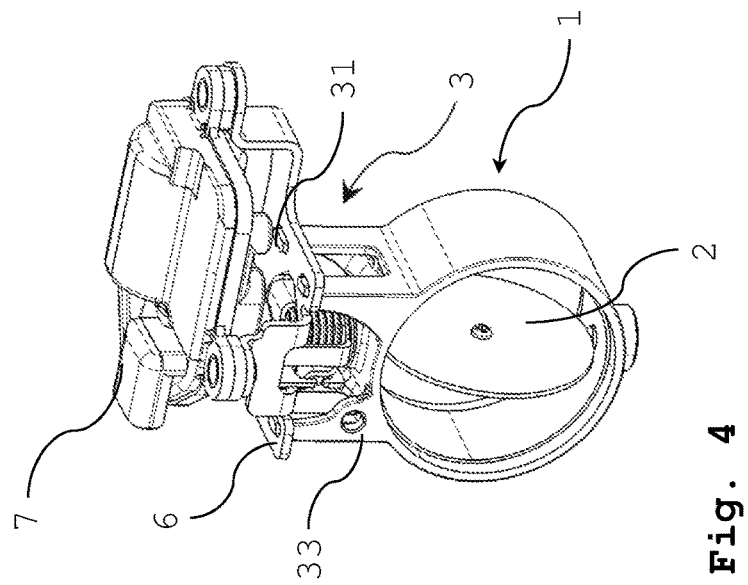
FIG. 4 shows the valve unit of FIG. 3 further comprising an actuator.

As shown in FIG. 1, a valve unit comprises a cylindrical valve housing 1 and a valve flap 2 rotatably arranged in the housing 1. The valve flap 2 is fixedly arranged on a rotatable valve shaft, not shown more closely in the figure, supported in the housing 1 and having a rotational axis 21. The valve flap 2 turns about a rotational axis 21, coinciding with the rotational axis of the valve shaft, in a rotary range of up to 90° and in FIG. 1 it is represented in a position in which the pipe cross-section of the valve housing 1 is fully opened.

A coupler 4 arranged at the end of the valve shaft is situated outside of the housing 1 for transmitting a rotational motion from an actuator to the valve flap. A spring element 5 in the coupler 4 pretentions the valve shaft in its operation position and allows for small movements due to dilatation of the parts during operation of the valve unit.

The valve unit further comprises an interface 3 having an engagement portion with four engagement legs 31 arranged at the distal end of the support which is formed by struts 320. The struts 320 project from and are directly connected to the valve housing 1. A shoulder 35 is formed at the distal end of each of the struts 320 at the transition between the struts 320 and the engagement legs 31 as shown in the detailed representation in FIG. 1b. The engagement legs 31 are formed by beads having the shape of rectangular cuboids and are arranged in a direction parallel to the rotational axis 21 of the rotatable valve flap. The beads may also have a cylindrical or oval shape. The struts 320 may have various shapes, such as square or rectangular, tubular, I-shaped or, as in the present embodiment shown in FIG. 1, L-shaped.

The engagement portion is standardized, that is to say that it has a same configuration in location, size and shape of the engagement legs 31 independently from the valve housing 1 and independently from the actuator to be used. The standardized engagement portion, and in particular its engagement legs 31, are, however, configured to engage an connection plate 62 of the adapter 6, which comprises standardized engagement elements, for example engagement orifices, adapted to engage the engagement legs 31 of the standardized engagement portion.

In this particular embodiment depicted in FIG. 1, the interface forms one-piece with the valve housing and was formed in the mold during casting of the valve housing 1 comprising the interface 3. This procedure has the advantage of allowing several parts of the valve unit to be integrated into one casting step with no need for additional steps of connecting a support for the actuator onto the valve housing 1.

The interface 3 may, however, also be mounted onto the valve housing in a separate step, in case a one-step manufacture is not desired. In this case, the parts for forming the interface 3 may be formed separately and welded onto a tubular valve housing 1. Alternatively, an additive manufacturing technique may be used during which the interface is, for example, added on top of the tubular valve housing 1 using 3D printing technique.

The interface 3 comprises in one of the struts 320 a datum point 33 serving as a reference point for subsequent machining or assembly process steps. In the present embodiment, the datum point is formed by a through-hole 33, which may be used as marking orifice, for example, for fixation of tools for additional machining of the raw cast valve housing. The through-hole 33 may also be used as attachment for holding the valve housing 1 in a particular position, thereby enhancing the ease of processing of the valve unit.

The large openings in between the struts 320 in the interface 3 shown in FIG. 1 allow surrounding atmosphere to pass through the interface 3 for cooling of an inner space surrounded by the interface 3. Additionally, the openings reduce the area of the struts 320 and thereby the cross-section of the struts 320, thereby reducing the conduction of thermal energy from the valve housing 12 to the adapter 6 via the struts 320 of the interface 3.

FIG. 1a illustrates the interface 3 arranged on a valve housing 1 with a standardized engagement portion, the interface having a larger diameter than the valve housing shown in FIG. 1. The distances between the engagement legs 31 of the engagement portion are identical to the distances of the engagement legs 31 of the engagement portion of the embodiment shown in FIG. 1, despite the larger size of the valve housing 1. Thus, the interface will engage a same adapter 6 via the standardized engagement portion due to the same configuration of the engagement legs 31 of the standardized engagement portion identical to the standardized engagement portion of the smaller valve housing of FIG. 1, hence providing high modularity of the valve unit.

FIG. 2 shows an adapter 6 which is formed by a sheet metal. The connection plate 62 of the adapter 6 is flat and has through-holes 61 configured to engage with the engagement legs 31 of the standardized engagement portion of the interface 3. For this purpose, the connection plate 62 of the adapter 6 comprises standardized engagement orifices formed by elongated slots 61 (engagement slots) adapted in location, size and shape to cooperate with the engagement legs 31. The engagement legs 31 are designed such that the elongated engagement slots 61 will interference-fit the engagement legs when arranged onto the interface 3. Additionally, the adapter 6 has a coupler access 64 for accessing the coupler 4. The interface 3 being standardized, it will fit the corresponding standardized adapter 6 independently from the form and shape of the valve housing 1 and independently from the actuator to be paired with the valve unit.

Due to the standardized configuration of the engagement slots 61 in the connection plate 62 of the adapter 6, the adapter 6 will engage the standardized engagement portion of the interface 3 of the valve shown in FIG. 1 as well as the standardized engagement portion of the interface of FIG. 1a despite valve housings 1 of different sizes.

In the embodiment shown in FIG. 2, the adapter 6 also comprises three mounting portions 63 onto which an actuator may be fixedly arranged, for example screwed. This adapter 6 is on one side designed such to be paired to a specific actuator via corresponding mounting portions 63 and on the other side such to be paired with the standardized engagement portion of the interface 3, accordingly. In other words, the mounting portion 63 of the adapter 6 is standardized for a specific actuator, but may differ from one actuator to the other, whereas the engagement slots 61 in the connection plate 62 are standardized for engaging the engagement legs 31 of the standardized engagement portion. In particular, in the embodiment shown in FIG. 2, the mounting portion 63 is formed by three engagement legs 31 projecting from the connection plate 62 of the adapter 6, the engagement legs 31 being extensions of the sheet metal, the connection plate 62 is made of. The connection plate 62 may, however, have shapes other than flat.

Figure 3:
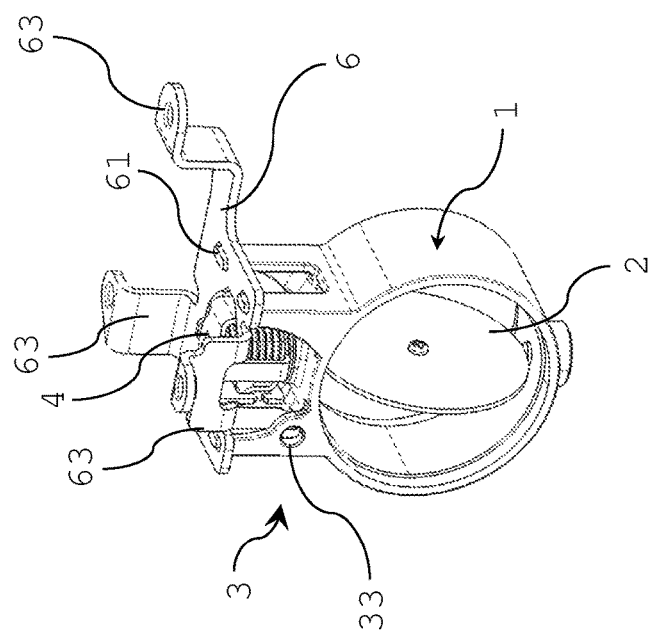
FIG. 3 depicts a valve unit comprising the valve shown in FIG. 1 further comprising an adapter according to an embodiment of the invention.

In the valve unit shown in FIG. 3, an adapter 6 is arranged onto the interface 3 and the connection portion 62 engages the engagement legs 31 of the standardized engagement portion in an interference-fit manner. The connection plate 6 abuts against the shoulder 35 of the interface 3. The adapter 6 may, in a subsequent step, be fixedly attached to the engagement legs 31 by applying welding spots onto the connection portion 62 and the distal ends of the engagement legs 31 extending through the engagement slots 61 of the connection portion, thereby welding both parts together. The flat connection plate 62 is arranged orthogonal to the rotational axis 21 of the valve flap.

In FIG. 4, an actuator 7 is mounted, in particular screwed, onto the mounting portions 63. The actuator 7 is rotationally connected to the coupler 4 for transmitting a rotational motion in order to operate the valve flap 2. The mounting portions 63 of the adapter 6 are configured to cooperate with corresponding fixation on the actuator. Different adapters 6 having different configurations of the mounting portion 63 may be designed depending on the actuator 7 to be used, the engagement slots 61 being standardized on their own such to cooperate with the engagement legs 31 of the interface 3 independently from the size and shape of the valve housing 1.

FIGS. 5-8 show in perspective side-elevational views of additional embodiments wherein the valve flap and the coupler are not represented. The FIGS. 5a-8a show side views of the corresponding FIGS. 5-8.

FIGS. 5 and 5a represent an embodiment according to the invention wherein the interface is formed by two plate-like projections arranged such to form a V-shaped support 32. At the end of the V-shaped support 32, the interface 3 comprises four legs 31 for engaging with the adapter accordingly. A coupler orifice 34 is arranged in the center of the interface 3 for accessing a coupler (not shown). The distal end of the projections of the V-shaped support 32 also form shoulders 35 against which the connection plate 62 will abut when positioned onto the interface 3 when assembled. A closer view of the shoulder 35 is shown in the detailed representation FIG. 5b of part of the interface according to the embodiment of FIGS. 5 and 5a.

Figure 6B:
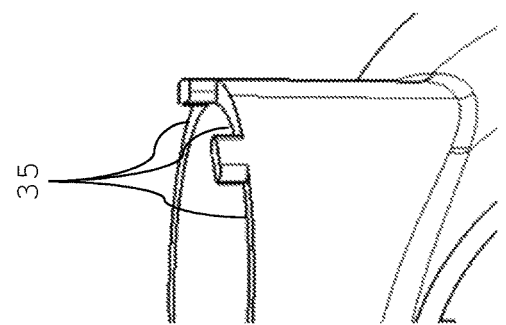
Figure 6:
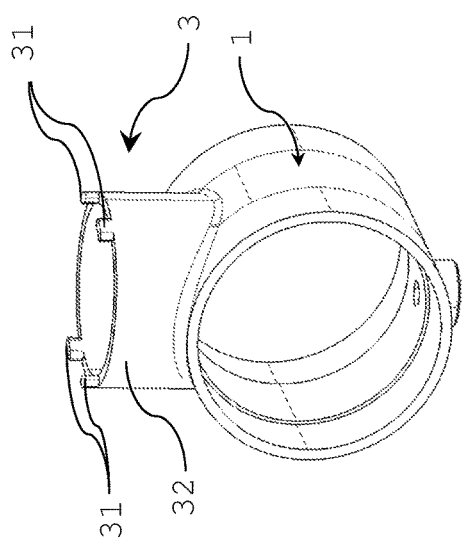
FIGS. 6 and 6a shows even another embodiment of the valve housing comprising an interface according to the invention.
Figure 6A:
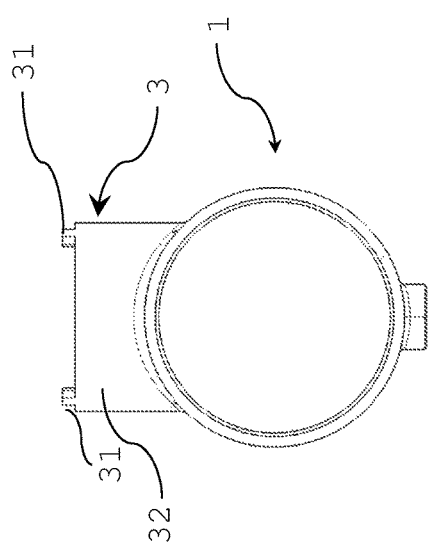

The embodiment shown in FIGS. 6 and 6a has an interface 3 which has a cylindrical shape. The support 32 of the interface 3 is formed by a cylindrical part, which wall is surrounding the interior space of the interface 3, in which interior space the coupler 4 is arranged when the valve unit is assembled. The cylindrical support 32 has no lateral or radial openings and therefore optimally protects the coupler 4 in the interior space and has a very high stiffness. The distal end of the wall of the cylindrical support 32 serves as shoulder 35 against which the connection plate 62 of the adapter 6 will abut in the assembled state. A closer view of the shoulder 35 is shown in the detailed representation FIG. 6b of part of the interface according to the embodiment of FIGS. 6 and 6a. However, this embodiment has the disadvantage that no surrounding atmosphere is allowed to pass through the interior space of the interface 3, thereby preventing cooling of the inner space.

In FIGS. 7 and 7a, another embodiment of the valve unit is shown, wherein the support 32 of the interface 3 is formed by four supporting struts 321 as well as by cross-linking diagonal bars 322, forming a rectangular cuboid inner space. The diagonal bars 322 enhance the stiffness of the interface 3 and ensure low thermal conductivity due to the small cross-sections of the diagonal bars 322 and of the struts 321. Additionally, the large holes formed by this structure in the support 3 lead to excellent flow of the surrounding atmosphere through the interface 3, thereby ensuring enhanced cooling of the inner space. On top of the struts 321, a pair of transversal bars 323 joins the top edges where diagonals of adjacent sides of the support 32 cross. On top of the transversal bars 323, two pairs of engagement beads 31 are arranged for forming the engagement legs of the engagement portion and for engaging an adapter 6. The transversal bars also serve as shoulder for precise positioning of the adapter 6, whose connection plate 62 abuts against the transversal bars 323. A closer view of the shoulder 35 is shown in the detailed representation FIG. 7b of part of the interface according to the embodiment of FIGS. 7 and 7a.

Figure 8B:
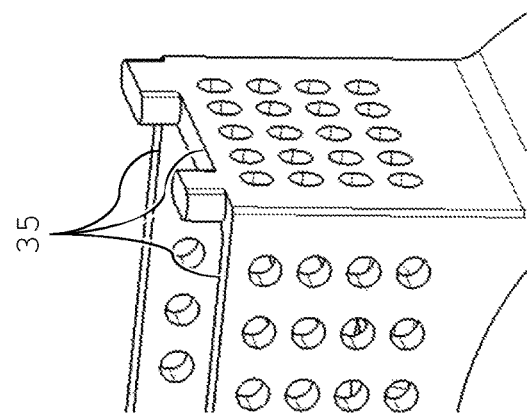
Figure 8:
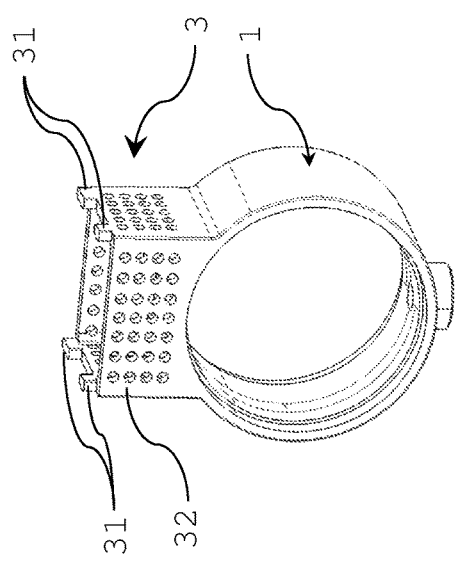
FIG. 8 show an additional embodiment of the valve and 8a housing comprising an interface according to the invention.
Figure 8A:
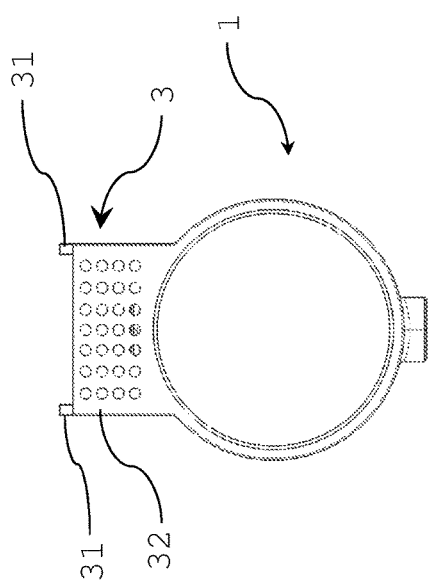

Similarly to the embodiment of FIGS. 7 and 7a, the embodiment shown in FIGS. 8 and 8a depict an interface 3 having a rectangular cuboid shape. The lateral sides of the support 32, however, have perforations. The support 3 is surrounding the coupler 4 and the perforations in the perforated wall plates allow the surrounding atmosphere to flow through the inner volume formed by the interface 3. In particular, this structure of the support 32 allows ambient air to enter the inner volume of the interface 3 for cooling of the coupler 4. Additionally, in this arrangement of the interface 3 shields and protects the coupler 4, thereby minimizing the risk for damage of the coupler 4, and also limits the heat conduction from the valve housing 1 to an actuator via the adapter by reduced conduction area of the perforated wall plates and surrounding atmosphere being allowed to flow through the inner space of the interface 3. In this embodiment, too, the distal end of the wall of the cuboid support 32 serves as shoulder 35 against which the connection plate 62 of the adapter 6 will abut in the assembled state. A closer view of the shoulder 35 is shown in the detailed representation FIG. 8b of part of the interface according to the embodiment of FIGS. 8 and 8a.

The valve unit according to the invention may be easily connected to a pipe. For that purpose, the inlet and outlet of the valve housing 1 are welded to the pipe. The interface 3 is already part of the valve housing 1, either one-pieced or in several parts assembled. The adapter 6 is not fixedly attached to the interface 3 at this stage yet. In the shown embodiments, the interface width d is the same as the valve housing width D, but may be smaller than the valve housing width D. The restricted width d of the interface 3 allows for excellent accessibility of the inlet and outlet of the valve housing 1 for welding to the pipes, particularly useful in robot operated units.

Additional advantage is given, when the valve housing 1 and the interface 3 are made as one-piece structure, as the welding of the inlet and outlet does not occur on an already existing weld between the valve housing 1 and the interface 3, which may lead to deformation of the valve unit.

After the pipes and the valve housing 1 have been welded together and the coupler 4 comprising the spring 5 positioned in engagement with the valve flap, the adapter 6 is easily connected to the interface 3 via the engagement legs 31 of the engagement portion. Subsequently, the connection plate 62 of the adapter 6 is, for example, welded to the engagement legs 31 and the actuator 7 screwed onto the mounting portion of the adapter 6. Of course, other sequences of the aforementioned steps are possible.

Various aspects of the valve unit according to the invention have been described with the aid of the embodiments. However, the invention is not limited to the embodiments or the particular combination of aspects shown in the embodiments, as various changes and modifications to the shown embodiments are conceivable without departing from the technical teaching underlying the invention. Therefore, the scope of protection is defined only by the appended claims.

The invention claimed is:

1. Valve unit for controlling the flow rate of an intake or exhaust gas of a combustion engine through a passage of a valve, the valve unit comprising:
   the valve having a valve housing and at least one valve flap,
   wherein the valve unit further comprises an interface and an adapter, the interface being connected to the valve housing and having a support and an engagement portion comprising at least two engagement legs projecting from a distal end of the support and being directed away from the valve housing,
   wherein the adapter has a connection plate having at least two engagement orifices and a mounting portion for holding an actuator, and
   wherein the at least two engagement orifices of the connection plate of the adapter are each configured to engage the corresponding at least two engagement legs of the engagement portion of the interface.

2. The valve unit according to claim 1, wherein at least the connection plate of the adapter is made of sheet metal.

3. The valve unit according to claim 1, wherein the interface comprises a shoulder arranged at the distal end of the support at a transition to each engagement leg against which shoulder the connection plate of the adapter abuts.

4. The valve unit according to claim 1, wherein the engagement legs are self-centering and are form-fitted or interference-fitted with the engagement orifices in the connection plate.

5. The valve unit according to claim 1, wherein the connection plate of the adapter is mechanically attached to the engagement legs by interference-fit or welded to the engagement legs.

6. The valve unit according to claim 1, wherein the interface is formed as a one-piece structure with the valve housing.

7. The valve unit according to claim 1, wherein the interface is added onto the valve housing by additive manufacturing.

8. The valve unit according to claim 1, wherein the interface has an interface width which is smaller or equal to a valve housing width.

9. The valve unit according to claim 1, wherein the at least two engagement legs of the interface are configured asymmetrically.

10. The valve unit according to claim 1, wherein the at least two engagement legs of the interface are non-colinear.

11. The valve unit according to claim 1, wherein the interface comprises at least one datum point.

12. The valve unit according to claim 11, wherein the at least one datum point is at least one through-hole.

13. Valve assembly comprising the valve unit according to claim 1, further comprising the actuator fixedly mounted onto the adapter.

14. The valve unit according to claim 1, wherein the at least two engagement orifices of the connection plate of the adapter are through holes.

15. The valve unit according to claim 1, wherein the at least two engagement legs comprise at least three engagement legs, and the at least three engagement legs are non-colinear.

16. Method for connecting the valve unit according to claim 1 to tubular pipes, comprising the steps of:
- welding an inlet and an outlet of the valve housing to the tubular pipes, subsequently
- placing the adapter onto the interface by engaging the engagement orifices of the connection plate with the engagement legs of the engagement portion of the interface, and subsequently
- attaching the adapter to the engagement legs of the interface.

17. The method according to claim 16, wherein the adapter is attached to the engagement legs of the interface by welding.

18. The method according to claim 16, wherein the adapter is attached to the engagement legs of the interface by mechanical fastening.

* * * * *